US007891851B2

(12) United States Patent
Alcelik

(10) Patent No.: US 7,891,851 B2
(45) Date of Patent: Feb. 22, 2011

(54) HEADLAMP WITH LONG-DISTANCE ILLUMINATION WITHOUT GLARING EFFECT

(76) Inventor: Turhan Alcelik, Cukurambar Mah., 44. Cad., 457 Sok., No. 2/26, Balgat, 06530 Ankara (TR)

( * ) Notice: Subject to any disclaimer, the term of this patent is extended or adjusted under 35 U.S.C. 154(b) by 215 days.

(21) Appl. No.: 11/910,884

(22) PCT Filed: Mar. 31, 2006

(86) PCT No.: PCT/TR2006/000012

§ 371 (c)(1),
(2), (4) Date: Oct. 5, 2007

(87) PCT Pub. No.: WO2006/107287

PCT Pub. Date: Oct. 12, 2006

(65) Prior Publication Data

US 2008/0180964 A1 Jul. 31, 2008

(30) Foreign Application Priority Data

Apr. 5, 2005 (TR) .......................... A 2005 01255
Feb. 23, 2006 (TR) .......................... A 2006 00838

(51) Int. Cl.
*B60Q 1/00* (2006.01)

(52) U.S. Cl. ...................... 362/507; 362/512; 362/538; 362/539; 362/516

(58) Field of Classification Search ......... 362/516–518, 362/512, 539, 538
See application file for complete search history.

(56) References Cited

U.S. PATENT DOCUMENTS 1,300,202 A 4/1919 Stubblefield
1,614,027 A 1/1927 Graf
1,683,896 A 9/1928 Jacob
1,814,669 A 7/1931 Cushing
2,185,203 A 1/1940 Lanoue
2,215,203 A 9/1940 Young
2,516,377 A 7/1950 Fink
2,632,842 A 3/1953 Grupen et al.
3,598,989 A 8/1971 Biggs
4,089,047 A 5/1978 Luderitz
4,456,948 A 6/1984 Brun (Continued)

FOREIGN PATENT DOCUMENTS

DE 195 26 023 A1 1/1997

(Continued)

*Primary Examiner*—Anabel M Ton
(74) *Attorney, Agent, or Firm*—Akerman Senterfitt

(57) ABSTRACT

A headlamp, developed especially for motor vehicle illumination, wherein the light source and reflector surfaces are fully concealed from the oncoming traffic users, having a light plane with fully adjusted height, operating according to the half-lens illumination principle, providing a long-distance illumination without glaring effect by preventing the all of the light rays generated at the light source from reaching to the eye level (EE) of oncoming traffic users. The preferred embodiment of the system (40, 50) consists of three independent reflector units (2, 3), (12, 13), (22, 23) with triple light pathway, designed similar to clover leaf, having a standard light source (1) located at their common first focal point (f1) mounted in a headlamp enclosure (20). The system consists of a lighting assembly that can be used not only in motor vehicle headlamp system but also in general lighting systems and in all optical devices. The system may be applied as an in-bulb structure.

9 Claims, 6 Drawing Sheets

U.S. PATENT DOCUMENTS

| | | | | |
|---|---|---|---|---|
| 4,480,291 | A | 10/1984 | Dranginis | |
| 4,605,991 | A | 8/1986 | Fylan | |
| 4,620,269 | A | 10/1986 | Oyama | |
| 4,802,067 | A | 1/1989 | Ryder et al. | |
| 5,077,642 | A | 12/1991 | Lisak | |
| 5,077,648 | A | 12/1991 | Rosz | |
| 5,077,649 | A | 12/1991 | Jackel et al. | |
| 5,124,891 | A | 6/1992 | Blusseau | |
| 5,278,731 | A * | 1/1994 | Davenport et al. | 362/551 |
| 5,414,601 | A | 5/1995 | Davenport et al. | |
| 5,944,415 | A | 8/1999 | Kurita et al. | |
| 6,007,223 | A | 12/1999 | Futami | |
| 6,109,772 | A | 8/2000 | Futami et al. | |
| 6,152,589 | A | 11/2000 | Kawaguchi et al. | |
| 6,220,736 | B1 | 4/2001 | Dobler et al. | |
| 6,244,731 | B1 | 6/2001 | Koiko et al. | |
| 6,375,341 | B1 | 4/2002 | Denley | |
| 6,386,744 | B1 | 5/2002 | Scholl | |
| 6,416,210 | B1 | 7/2002 | Uchida | |
| 6,422,726 | B1 | 7/2002 | Tatsukawa et al. | |
| 6,428,195 | B1 | 8/2002 | Ohshio et al. | |
| 6,430,799 | B1 | 8/2002 | Ballard et al. | |
| 6,457,850 | B2 | 10/2002 | Oyama et al. | |
| 6,504,265 | B2 | 1/2003 | Toda et al. | |
| 6,513,958 | B2 | 2/2003 | Ishikawa | |
| 6,543,910 | B2 | 4/2003 | Taniuchi et al. | |
| 6,543,916 | B2 | 4/2003 | Shirai | |
| 6,558,026 | B2 | 5/2003 | Strazzanti | |
| 6,572,248 | B2 | 6/2003 | Okuchi et al. | |
| 6,796,696 | B2 * | 9/2004 | Taniuchi | 362/539 |
| 7,175,322 | B2 * | 2/2007 | Tanaka | 362/517 |
| 7,316,493 | B2 * | 1/2008 | Kinoshita | 362/539 |
| 7,401,958 | B2 * | 7/2008 | Okada | 362/517 |
| 7,416,322 | B2 * | 8/2008 | Tanaka et al. | 362/514 |
| 7,452,115 | B2 * | 11/2008 | Alcelik | 362/516 |
| 2002/0186565 | A1 | 12/2002 | Taniuchi et al. | |
| 2003/0081424 | A1 | 5/2003 | Albou et al. | |
| 2006/0164850 | A1 * | 7/2006 | Tanaka | 362/509 |
| 2008/0180964 | A1 * | 7/2008 | Alcelik | 362/507 |

FOREIGN PATENT DOCUMENTS

| | | | |
|---|---|---|---|
| EP | 1 213 532 | A2 | 6/2002 |
| EP | 1 288 563 | A1 | 3/2003 |
| FR | 539 045 | | 6/1922 |
| FR | 2 627 845 | A1 | 9/1989 |
| FR | 2 668 434 | A1 | 4/1992 |
| FR | 2 808 867 | A1 | 11/2001 |
| GB | 446 358 | | 4/1936 |
| GB | 2 149 077 | A | 6/1985 |
| JP | 8-335402 | | 12/1996 |
| WO | WO 2005/010430 | A1 | 2/2005 |

* cited by examiner

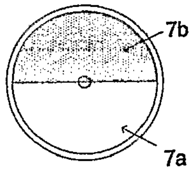
Resim 12a
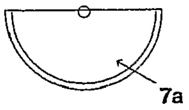
Resim 12b
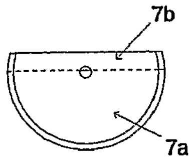
Resim 12c
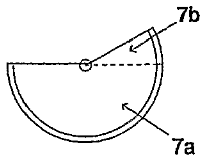
Resim 12d
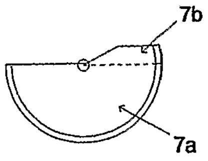
Resim 12e
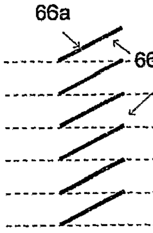
Resim 13a
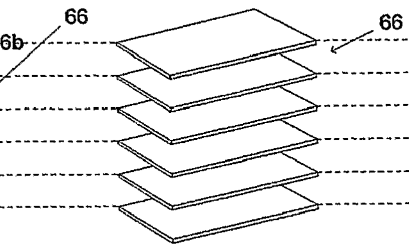
Resim 13b
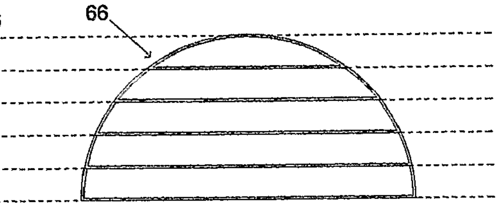
Resim 13c
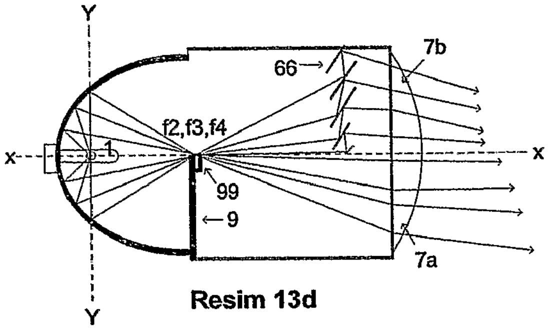
Resim 13d
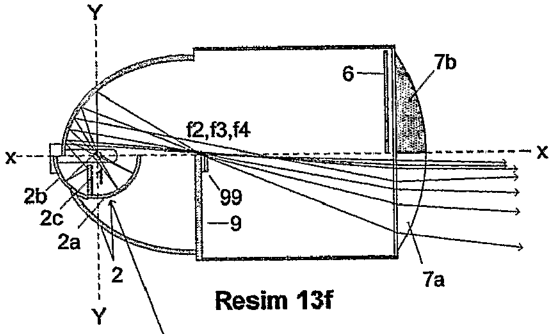
Resim 13f
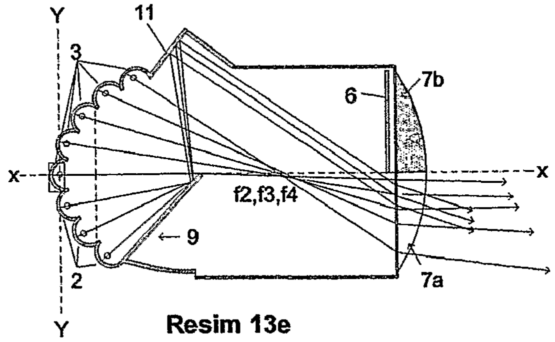
Resim 13e
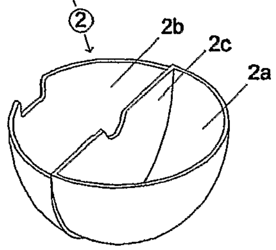
Resim 13g
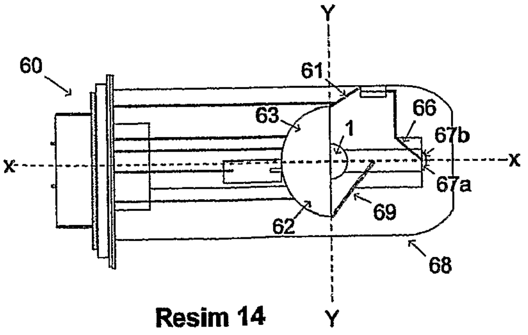
Resim 14

HEADLAMP WITH LONG-DISTANCE ILLUMINATION WITHOUT GLARING EFFECT

The motor vehicle lighting system under the present invention consists of a headlamp assembly preventing glaring effect on the oncoming drivers and pedestrians caused by motor vehicle lighting systems, while providing a long-distance illumination. The system consists of a lighting assembly that can be used not only in motor vehicle headlamps but also in general lighting and in all optical devices.

A number of research has been made to avoid glaring effect on the eyes of oncoming drivers and pedestrians during nighttime driving, while providing a good road illumination under any weather and road conditions. Some examples of such past studies are given below:

Studies on vehicle headlamp of classical projection type; The U.S. Pat. Nos. 1,614,027; 2,215,203; 6,007,223; 6,220,736; and 6,416,210.

Studies on vehicle headlamp using movable reflectors; The U.S. Pat. Nos. 5,077,642; and 6,543,916.

Studies using anti-glare shields; The U.S. Pat. Nos. 5,077,648; 6,375,341; 6,386,744; 6,422,726; 6,428,195; 6,430,799; and FR patent no. 2808867.

Studies on acting on the principle of indirect illumination based on the principle of concealing the light source and reflector surface; The U.S. Pat. Nos. 1,300,202; 1,683,896; 2,516,377; 4,089,047; 4,456,948; 4,480,291; 4,605,991; 4,620,269; 6,457,850; 5,414,601; FR patent no. 2668434; and JP patent no. 7-164500.

Studies on a headlamp design using such light obstructing structures as shield, shutter and mask placed in front of the light source, reflectors and headlamp front lens (cover glass); The U.S. Pat. Nos. 3,598,989; 5,077,649; 5,124,891; 6,109,772; 6,543,910; 6,558,026; 20030081424; the GB patents no. 446358; 2149077; and FR patent no. 2627845.

Studies based on adjusting the luminance of headlamp; The U.S. Pat. Nos. 4,802,067; 6,504,265; 6,513,958; and 6,572,248.

Study using multi-piece reflector surfaces and using the top and bottom reflector walls as reflecting surface; The U.S. Pat. No. 5,944,415.

In addition to those below mentioned previous arts can be taken into consideration: U.S. Pat. Nos. 1,814,669; 2,185,203; 6,152,589; and 6,244,731; and EP patent no. 121352; and FR patent no. 539045;

While some of these studies provide a good road illumination, they fail to control glaring effects sufficiently, and others fully control glaring, but fail to ensure a road illumination at sufficient light intensity along required distances.

Among the above mentioned studies; any obstructions or masking devices placed in the light pathway, any paint or coating applied on the light source or reflector surfaces, film layers, micro particles and polarization on reflector surfaces, front lens or the windshield absorb some portions of the light rays, and reduce photometric measurements and the light intensity.

In projection type headlamp designs frequently used today; the light shield placed in front of the lower or upper reflector section can not provide a fall control of glaring while blocking part of the light produced thereby reducing the light intensity.

In some of the previous arts that are similar to our invention, which are based on the principle of fully concealing the light source and the reflecting surfaces from the oncoming traffic users, sufficient light intensity could not be achieved at required distances although glaring effect is fully controlled. The studies, which the light source and reflecting surfaces are not fully concealed from oncoming traffic users failed to achieve sufficient glaring control. In direct or indirect illumination methods in which the reflecting surfaces are fully concealed, illumination at sufficient light intensities could not be achieved at required distances with such concealment either by a single or several shields placed on the light pathway or by shutter shields as a light beam parallel to the road surface could not be ensured. In indirect methods in which the light source and reflecting surfaces are fully concealed, and the flat reflective surfaces placed parallel to the upper part of the headlamp enclosure or the upper and lower reflector walls are used as a flat reflective surface, illumination at sufficient light intensities could not be achieved as well.

Besides the above-mentioned deficiencies, the most important deficiency of the current standard passing beam (low-beam) illumination systems that is already in use is the failure to provide a road illumination at a safe braking distance without glaring effect. The purpose of the study hereunder is to provide a vehicle illumination system in which glaring effect is fully controlled while consistently providing a road illumination at a safe braking distance at an adequate light intensity during nighttime driving.

The headlamp design in the present invention consists of a vehicle illumination system causing no glaring effect on the oncoming traffic users based on half-lens illumination principle, in which only the lower half (7*a*) of the lens (7) is used for illumination by closing the upper half with an semi-shutter (6), by forming a light plane with fully adjusted height wherein the light source and reflecting surfaces are fully concealed from oncoming drivers, pedestrians and an observer looking over the horizontal planes (XX, X'X' and X"X") practically passing from the top level of headlamp openings and parallel to the road surface, the light beam produced at the light source is the most efficiently focused by specially designed reflectors or reflecting surfaces.

The most preferred embodiments (40,50) of the headlamp assemblies designed under the present invention consists of three independent reflector units (2,3),(12,13),(22,23), designed in the form of "clover leaf", having a light source (1) on the first common focus (f1) and each having its own light pathway.

One of the purposes of the headlamp in the present invention is to use the generated light for illumination in the most efficient manner, to achieve an illumination with a higher photometric performance compared to classical headlamp, and to establish a motor vehicle passing beam illumination with a fully controlled glaring effect on the oncoming traffic users, while providing an adequate illumination at long distances.

Another purpose of this invention is to obtain combined positive effects of the vehicles approaching each other, and to improve the view distance and the vision quality for vehicles traveling in the same direction as well as for opposing vehicles.

A further purpose of this invention is to ensure a headlamp design that allows the rear view mirror to be used in "daytime view mode" during nighttime driving, thus providing a safer and more comfortable driving.

The characteristics, principles of operation, purposes and advantages of the headlamp assemblies (40,50) under the present invention will be better understood upon examination and detailed description of the drawings.

FIGS. 12*a, b, c, d, e*, are the schematic drawings for different applications of he preferred lens types (7, 17, 27, 67).

FIGS. 13*a*, *b* and *c* are the side view (13*a*), perspective (13*b*) and front view (13*c*) of the preferred shutter types.

FIGS. 13*d, e, f* and *g*, show different applications of the preferred embodiments (40, 50) (FIG. 13*d*, shows the schematic view of the reflection technique used in the embodiment with shutter; FIG. 13*e*, shows the schematic view of application of the system with LED (light emitting diode); FIG. 13*f*, shows the embodiment in which the lower reflector section is in the form of hemisphere (2*a*, 2*b*, 2*c*); FIG. 13*g*, shows the detailed perspective view of said preferred hemisphere).

FIG. 14 is the preferred special-design bulb type (60).

Figure 1:
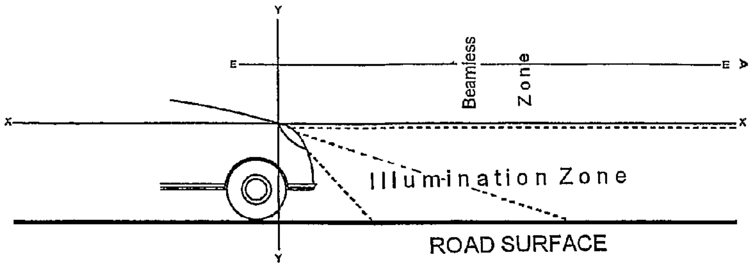
FIG. 1 shows the basic operating principle of the vehicle illumination system under the present invention.

The horizontal planes (XX, X'X' and X"X") passing through the optical center of the lens (7) shown in FIG. 1, and parallel to the road surface represent the upper levels of headlamp openings (8, 18, 28) for the forward-looking, downward-looking and upward-looking headlamp units, and the level (EE) represents the eye level of oncoming traffic users. The level (EE) is normally over the planes (XX, X'X' and X"X"). (YY) is the axis passing through the focal point of the headlamp and perpendicular to the road surface. FIG. 1 also shows the illuminated zone and dark (beamless) zone.

The dark zone described in FIG. 1 is the zone practically passing through the upper levels of the headlamp openings (8, 18, 28) and over the planes (XX, X'S' and X"X"), and the light reflected from the road surface or surrounding are not taken into account.

The basic operating principle of the motor vehicle illumination system under the present invention is to prevent the beams generated at the light source from exceeding the planes (XX, X'X' and X"X"), and to establish a motor vehicle illumination system without any glaring effect on the oncoming traffic users, while providing a long-distance road illumination by keeping these beams below the eye level (EE) of oncoming drivers, pedestrians or an observer. In case of vehicles with a headlamp level over the road surface such as trucks and off-road vehicles, the angle of light beams is more inclined towards the road surface compared to standard vehicles.

The basic operating principle is the same for all different embodiments under the present invention, and the travel direction of the vehicle is considered in stating the direction such as front, rear, right, left, lower, upper used to specify the directions for each headlamp unit as well as each headlamp component incorporated in these units.

Figure 2:
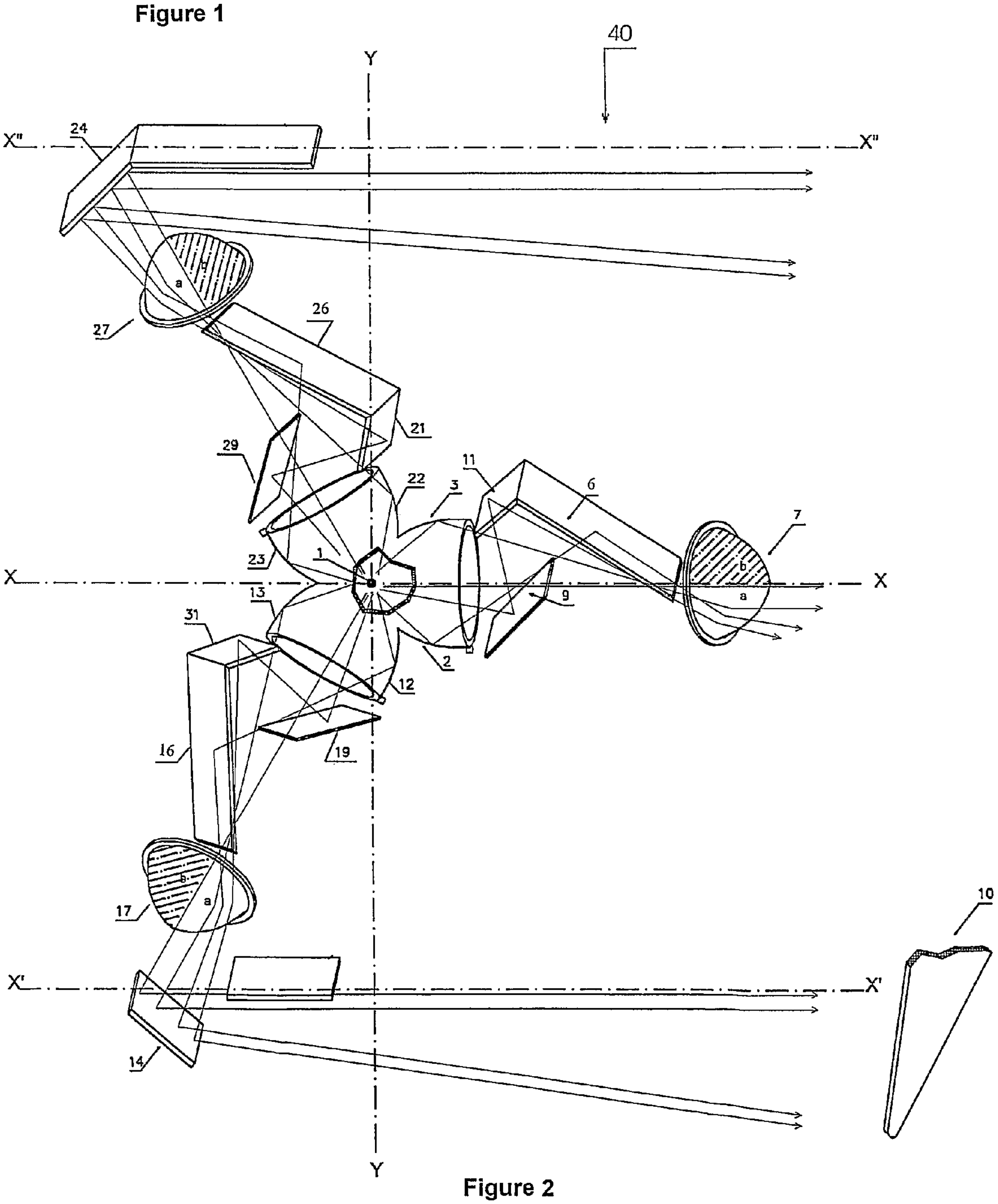
FIG. 2 is the perspective view showing the basic components of the first preferred embodiment (40) of the system similar to clover leaf.
Figure 3:
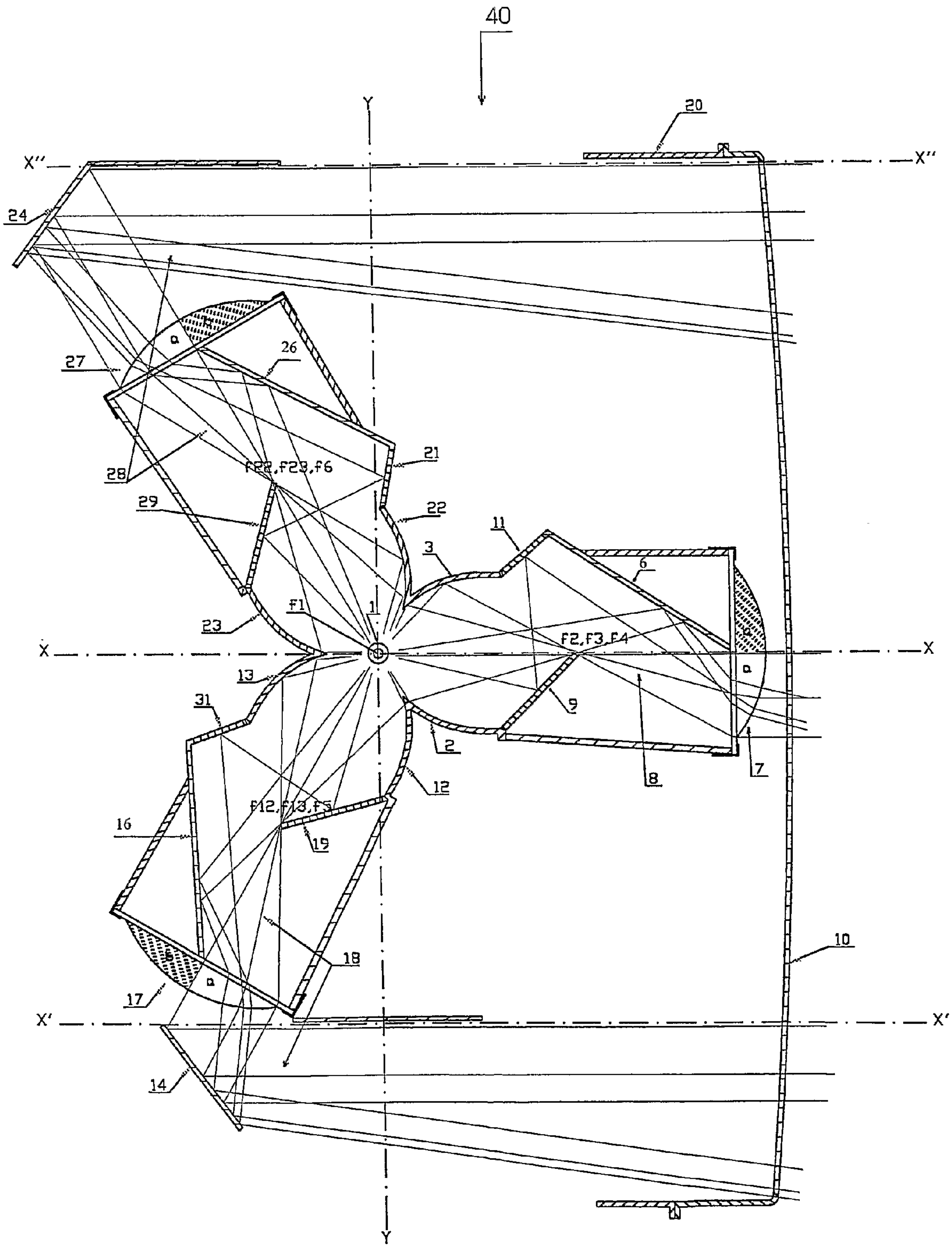
FIG. 3 is the side cross-sectional view of the embodiment (40) in FIG. 2.
Figure 4:
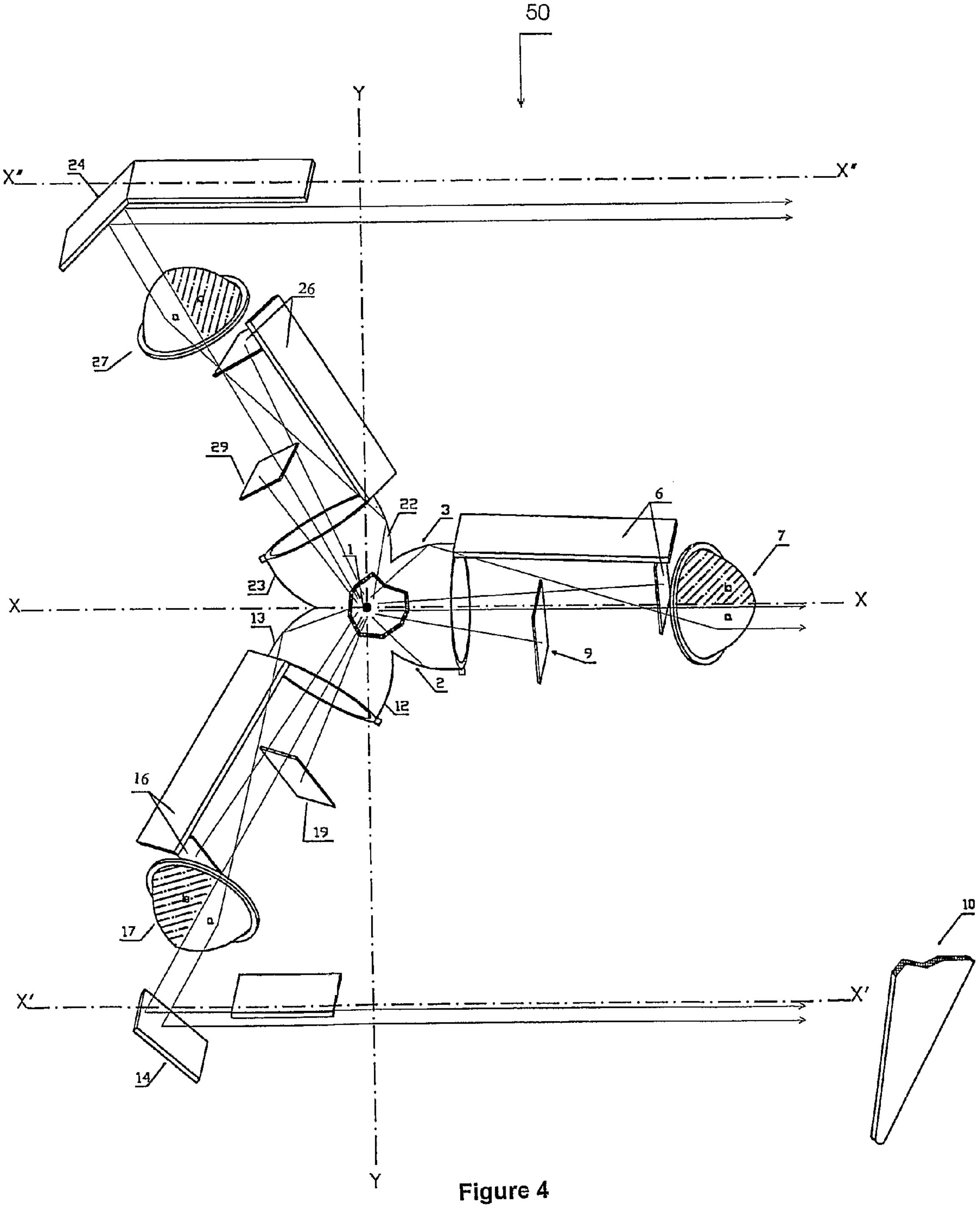
FIG. 4 is the perspective view of basic components of the second preferred embodiment (50).
Figure 5:
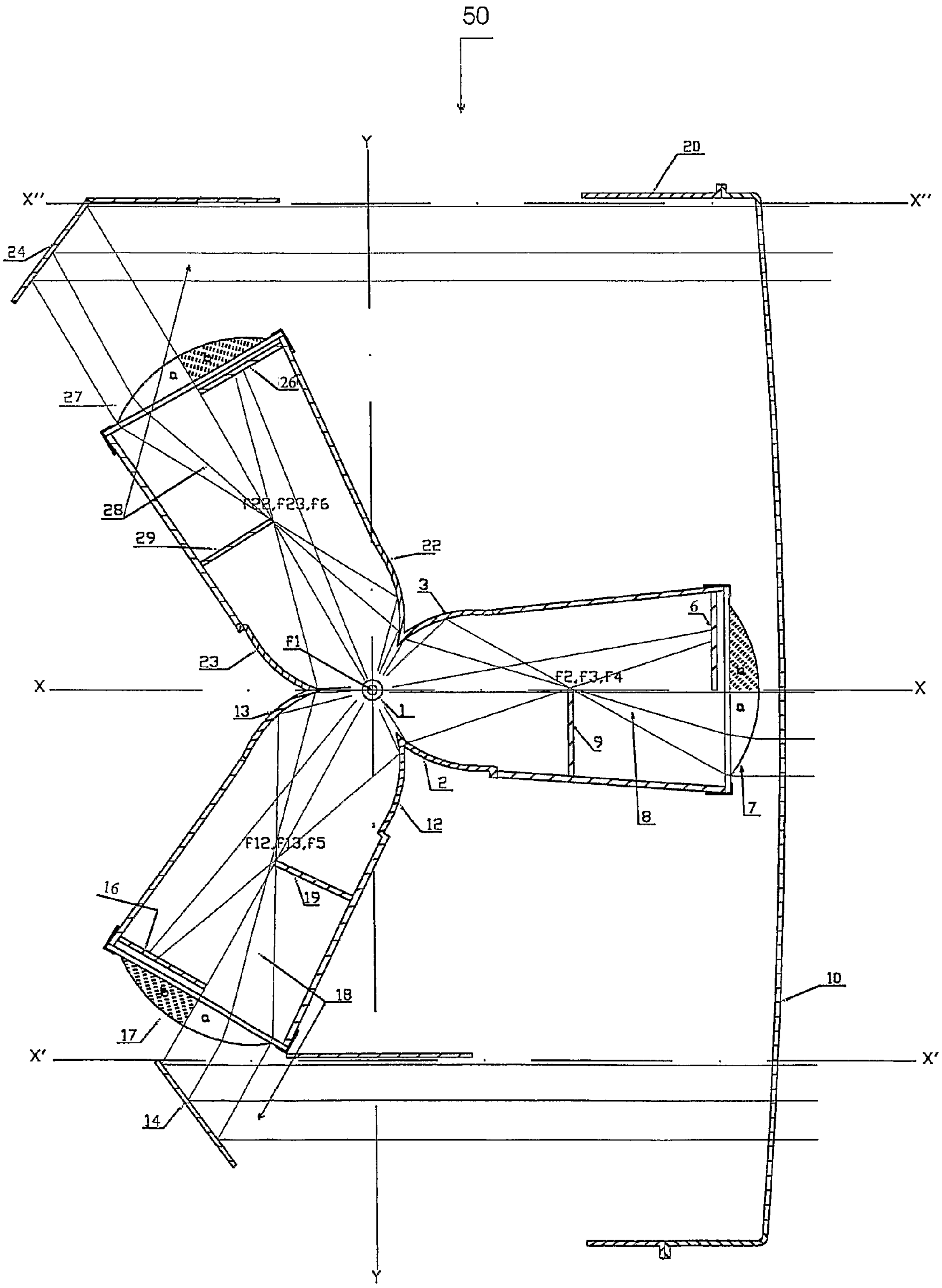
FIG. 5 is the side cross-sectional view of the embodiment (50) in FIG. 4.

FIGS. 2 and 3 show the basic components and the principle of operation of the preferred embodiment (40) of the headlamp in this invention, in the form of a clover-leaf, and FIGS. 4 and 5 the basic components of the second preferred embodiment (50). The headlamp design in question consists of one light source (1), a triple reflector group consisting of three reflector units, each of the said units looking forward (2,3), downward (12,13) and upward (22,23) respectively, and each reflector unit having its own light path.

The headlamp components for the preferred embodiment (40,50) are mounted in a headlamp housing (20) having a transparent front lens (10). The front lens (10) in question is mounted in said headlamp enclosure (20).

The headlamp embodiments under the present invention use standard Halogen or Xenon bulbs. The light source may be incandescent, HID (high intensity discharge), LED (light emitting diode), fluorescent or similar light sources, or optical fiber based illumination may be utilized.

The reflecting surfaces of each of the reflectors contained in the group of reflectors are elliptic or combined elliptic. However, these surfaces may be parabolic, spherical, cylindrical, ellipsoid or a combination thereof, or these reflecting surfaces may be in the form of multi-piece or in the free form surfaces.

The reflecting surfaces are made of metal, plastic, polycarbonate, ceramic, glass fiber and similar heat resistant materials, and coated with aluminum or similar material which is bright and reflecting. Boron may be added into the materials to improve the heat and impact resistance of the headlamp elements.

FIG. 2 shows the perspective view of the first preferred embodiment (40), and FIG. 3, the side cross-sectional view of the same embodiment (40). FIG. 4 shows the perspective view of the second preferred embodiment (50), and FIG. 5, the side cross-sectional view of the same embodiment (50).

Each of the forward-looking (2,3), downward-looking (12, 13) and upward-looking (22,23) units of the preferred embodiments (40,50) or the reflector sections of each unit can either be applied a independent headlamp or each of these reflector units (or reflector sections) can also be used as combined structures consisting of double, triple or more groups of reflector together with other units.

The combined structures consisting of a group of two reflectors can either be applied as a structure similar to "hourglass" formed by combination of downward-looking (12,13) and upward-looking (22,23) reflector units, or double structures in which the forward-looking unit (2, 3) is combined with either downward-looking or upward-looking unit.

The preferred combined embodiments (40,50) consisting of triple group of reflector of forward-looking (2,3), downward-looking (12,13) and upward-looking (22,23) reflector units are defined as "clover leaf headlamp". Each of the forward-looking (2,3), downward-looking (12,13) and upward-looking (22,23) reflector units of the preferred "clover leaf" embodiments (40,50) is provided with the headlamp elements described in detail below, whether they are applied as a combined part of "clover leaf" embodiment or as an independent headlamp unit:

The most preferred forward-looking headlamp unit (FIGS. 2, 3 and 6) of the first preferred embodiment (40) of the system incorporates at least one light source (1), at least one reflector section (2 and/or 3), at least one inclined light shield (9), at least one reflective surface (11) and at least one lens (7).

This embodiment incorporates a semi-shutter (6) preventing the light beams coming from light source (1), reflector surface (2,3) and all built-in reflective surfaces from reaching to the upper half lens (7*b*), and covering the upper half lens (7*b*). The inclined light shield (9) located in front of the lower reflector section (2). The light shield (9) and semi-shutter (6)

are so positioned that the beams from the light source (1) and reflector parts (2,3) reach only to the lower half lens (7*a*) passing through the opening (8) between the upper edge of the light shield (9) and lower edge of the semi-shutter (6), and then directed only towards the road surface.

As can be seen on FIGS. 2 and 3, the lens (7) is seen by oncoming traffic users, however, the upper edge of the shield (9) and the lower edge of the semi-shutter (6) are so adjusted that both edges are located near the horizontal plane XX passing through the optical center of the lens (7), and an oncoming observer, drivers and pedestrians looking over the plane XX can not see the light source (1) and reflector surfaces (2, 3).

The focal point (f4) of the lens (7) as well as the second focal points (f2,f3) of the reflector (2,3) are so adjusted that none of the beams directed by the lower half (7*a*) of the lens (7) exceeds the horizontal plane XX, and reaches at the eye level (EE) of oncoming traffic users. (The plane XX practically passes through the upper edge of the headlamp opening (8) of the forward-looking headlamp unit). Hence a motor vehicle headlamp obtained which is characterized by the light source and reflector surfaces being concealed from the oncoming traffic users, and providing a long-distance illumination without glaring effect.

The forward-looking reflector sections (2 and/or 3) of the first preferred embodiment (40) are so designed that the light source (1) is located near the common first focal point (f1) of the said reflector sections (2, 3). The second focal point (f3) of the upper reflector section (3) is so adjusted to be located near the middle section of the upper edge of the inclined shield (9), which is located in front of the lower reflector section (2) which is also the focal point (f4) of the lens (7).

The light rays from the upper reflector section (3) focused at the focal point (f3) are reflected to the lower half (7*a*) of the lens (7). These rays are directed by the lower half lens (7*a*) towards the road surface in the form of a parallel light beam, and provide a long-distance illumination below the plane (XX) passing through the optical center of the lens (7) and parallel to the road surface (within the illumination zone).

Some of the rays coming from the light source (1) and lower reflector section (2) are reflected on the semi-shutter (6) covering the upper half lens (7*b*), and most of these rays are reflected on the inside surface of the inclined shield (9). The second focal point (f2) of the lower reflector section (2) is so adjusted that the beams reflected on the shield (9) are reflected on the reflective surface (11) mounted in front of the upper reflector section (3). The reflective surface (11) reflects these beams to the lower half lens (7*a*). Some of the beams from the light source (1) and lower reflector section (2) are reflected on the semi-shutter (6) covering the upper half lens (7*b*). The semi-shutter (6) prevents these beams from reaching at the upper half (7*b*) of the lens, and reflects the beams reflected on itself to the lower half lens (7*a*). These beams in question are directed towards the road surface by the lower half lens (7*a*), and always remain below the plane XX (within the illumination zone) to provide short-distance illumination.

The shield (9) is mounted in front of the lower section (2) the forward-looking reflector unit, and prevents the lower reflector section (2) from being seen by the oncoming traffic users. The upper edge of the shield (9) is located near the plane XX, passing through the optical center of the lens and parallel to the road surface.

The inside surface of the shield (9) in the preferred embodiment is reflective. However, the inside surface of the shield (9) may also be non-reflective.

The embodiment in which the shield (9) is mounted in inclined position and its inside surface is reflective incorporates a reflective surface (11) mounted in front of the upper reflector section (3).

The inside surface of the reflective surface (11) is reflective, and is so positioned as to reflect the beams from the shield (9) with a reflective inside surface to the lower half lens (7*a*) at predetermined angles. The lower half lens (7*a*) directs these beams towards the road surface, thereby ensuring a significant illumination and traffic safety in lighting the road edges, sidewalks and turns. These beams also always remain below the plane XX (within the illumination zone).

The light shield (9) and/or reflective surface (11) may have surface sections with two or more reflection angles, or each of these components (9 and/or 11) may be provided one or more from each. Sections suitable for the preferred cut-off type may be formed on the upper edge of the shield (9). The upper edges of the shield (9) with suitable cut-off section may be provided with one or more auxiliary shields (99) that do not prevent the cut-off effect of the light, but prevent the light source (1) and reflector surfaces (2,3) from being seen through the cut-off gap by oncoming traffic users, to avoid uncontrolled reflection of light on the oncoming traffic users (see FIGS. 13*d* and *f*).

The semi-shutter (6) is mounted in front of the upper reflector section (3), and prevents the light beams from reaching at the upper half (7*b*) of the lens (7), and the upper reflector section (3) from being seen by oncoming traffic users looking over the horizontal plane XX. The semi-shutter (6) may be positioned vertical or inclined with respect to the horizontal plane XX. The inside surface of the semi-shutter (6) may be either reflective or non-reflective.

When the semi-shutter (6) is positioned vertical, those parts of beams directly coming from the light source (1) and of the beams from the lower reflector section (2) which are reflected on the semi-shutter (6) are not used for illumination. When, however, the semi-shutter (6) is inclined, then its angle is so adjusted as to reflect the beams reflected on it to the lower half lens (7*a*). The lower half lens (7*a*) directs these beams towards the road surface to contribute to short-distance illumination. These beams also always remain below the plane XX (within the illumination zone).

Each of the shield (9), reflective surface (11) and reflective inside surfaces of the semi-shutter (6) may be individually or all together flat, concave or convex or a combination thereof. Single- or double-sided cut-off sections may be formed on the lower edge of the semi-shutter (6) and/or upper edge of the shield (9) depending on whether the traffic flow is right-hand or left-hand.

The semi-shutter (6) may undergo many modifications in order to increase the light intensity in required zones (particularly at the road edges and dark zone) to increase visibility or for photometric light distribution. For this purpose, The semi-shutter (6) may be manufactured semi-translucent so that the upper half lens (7*b*) receives some amount of light. The lower edge of the semi-shutter may be designed to create a cut-off line depending on the type of cut-off preferred to enable part of the upper half lens (7*b*) to receive some amount of light. In this case, one or more auxiliary shields may be mounted in front or back of the semi-shutter (6) to prevent the light source (1) and built-in reflective surfaces from being seen by oncoming traffic users and avoid uncontrolled light on their eyes, just as the case for the auxiliary shield (99) used in cut-off lines for the shield (9).

Alternatively, the semi-shutter (6) preventing the beams from reaching at the upper half lens (7*b*) may be replaced by a prismatic lens (77) changing the direction of beams scattered on this part (7*b*) of the lens towards the horizontal plane XX. The purpose of this prismatic lens is to enable the beams from the light source (1) and built-in reflective surfaces to the upper half lens (7*b*) to reach at the upper half lens (7*b*) at a steeper angle, thereby keeping the beams directed by the upper half lens (7*b*) always below the horizontal plane XX.

In this type of embodiment, the lower half lens (7*a*) is used as the main light directing lens (main lens), whereas the upper half lens (7*b*) as an auxiliary lens. The purpose of this application is to use the light generated at the light source (1) most efficiently for illumination, to minimize the energy burden on the vehicle caused by illumination, to illuminate the road edges, sidewalks and turns more safely without using any additional mechanism, while providing longer-distance illumination when compared to standard systems.

In embodiments where the upper half lens (7*b*) is used as an auxiliary lens, the prismatic lens (77) may be replaced by a lens (7 and/or 77), which is flat, spherical, cylindrical, concave, convex, biconvex, biconcave lens, or a combination thereof, or by a Frensel lens (7*b* and/or 77).

As can be seen on FIGS. 13*a*, 13*b*, 13*c* and 13*d*, the semi-shutter (6) may be replaced by a multi-flaps shutter (66) covering the upper half lens (7*b*) in another application of the forward-looking unit.

Each of the shutter (66) flaps may be either reflective or non-reflective. The upper and/or lower surfaces of each flap are flat in the preferred embodiment, but may be flat, concave, convex or a combination thereof.

The position angles of the shutter flaps schematically shown in FIGS. 13*a* to 13*d* are so adjusted that the lower (rear) edge of each shutter flap as well as the upper (front) edge of the shutter flaps located underneath each of these flaps are mounted at least parallel to the plane XX. As a result, all shutter flaps are seen as an integral shield (66) whatever the number of shutter flaps is (FIG. 13*c*).

In these preferred embodiments, the position of the shutter (66) flaps and the shield (9) so adjusted that any observer or traffic users looking over the horizontal plane XX can not see the light source (1) and built-in reflective surfaces. In this embodiment, none of the beams directly coming from the light source (1) and those reflected by the lower (2) and upper (3) reflector sections can not reach to the upper half lens (7*b*) directly. Hence, the beams reflected through the shutter flaps and reaching to the upper half lens (7*b*) are only directed towards the road surface as they reach to the upper half lens (7*b*) at a steeper angle compared to standard projection type headlamp. Hence, an improved illumination is achieved with this type of headlamp application without any glaring effect.

The preferred embodiments with multi-flaps shutter (66), the second focal point (f2) of the lower reflector section (2) is so adjusted that most of the beams directly coming from the light source (1) and those reflected from the lower reflector section (2) reach to the upper surfaces (66*a*) of the shutter flaps without being blocked by the shield (9). They are then reflected to the lower surfaces (66*b*) of the shutter flaps to enable them to reach to the upper half lens (7*b*) at a steeper angle. The purpose is to ensure that the beams from the lower reflector section (2), but most of which are blocked by the shield (9) in the standard projection type headlamp are used for illumination to minimize the light losses, obtain a more efficient illumination and minimize the temperature increase inside the headlamp caused by the beams blocked by the shield (9).

The beams reflected by the lower surfaces of the shutter flaps (66*b*) and reaching to the upper half lens (7*b*) are directed only towards the road surface by the upper half lens (7*b*) which is used as an auxiliary lens. These beams are also kept below the horizontal plane XX and do not reach to the eye level (EE) of the oncoming traffic users, causing no glaring effect.

In this preferred embodiment, the angling of the shutter flaps are so adjusted that the beams reflected from the upper (66*a*) and lower (66*b*) shutter surfaces are directed towards the road edges by the upper half lens (7*b*) at a larger angle to have a significant advantage of vision by illuminating the sidewalks and turns. As a result, a significant vision distance and safety advantage is obtained in respect of both road safety and pedestrian safety particularly in urban roads and turns.

The lens (7) is in the form of a plano-convex lens having a flat back surface and an aspherical front surface, and may be spherical, cylindrical or a combination thereof, or in the form of a Frensel lens. The lens (7) may also be flat, concave, convex, biconcave, biconvex or a combination thereof.

As well as the lens may be in the form of a single-piece lens, it may also be a half lens in which only those parts of it, which are used for illumination are manufactured, or the system may be applied by manufacturing a lens suitable for the preferred cut-off type. For this purpose, as seen on FIGS. 12*a* and 12*b*, only the lower half (7*a*) of the lens is used for illumination, and as seen on FIGS. 12*c*, 12*d*, and 12*e*, the lens (7) may be modified depending on the preferred cut-off type to ensure that part of the upper half lens (7*b*) receives controlled amount of light to be used for illumination together with the lower half lens (7*a*). The upper half lens (7*b*) shown in FIGS. 12*a*, 12*c*, 12*d*, and 12*e*, may be semi-translucent or this upper half lens (7*b*) may be an independent half lens (7*b*) having a different refraction characteristics compared to the lower half lens (7*a*). In embodiments where the upper half lens (7*b*) is used for illumination partially or as a whole, the lower half lens (7*a*) is used as the main lens, and the upper half lens (7*b*) as an auxiliary lens.

The opening (8) is located between the shield (9) and semi-shutter (6), and allows the light coming from the light source (1) and reflector sections (2,3) to be directed towards the road surface. The upper edge of the opening (8) is near the plane (XX), and this edge is practically formed by the lower edge of the semi-shutter (6).

Figure 9:
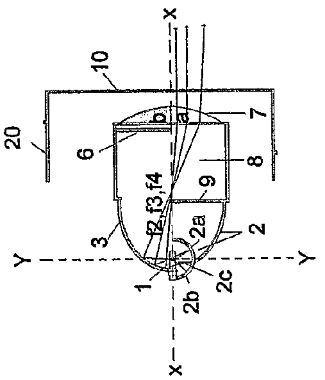

The most preferred forward looking unit of the second preferred embodiment (50) shown in FIGS. 4, 5 and 9 incorporates at least one light source (1), at least one reflector section (2,3,2*a*, 2*b*, 2*c*), at least one light shield (9) and at least one lens (7).

This headlamp structure contains a semi-shutter (6) preventing the lights coming from the light source (1), reflector sections (2,3,2*a*, 2*b*, 2*c*) and all built-in reflective surfaces from reaching to the upper half lens (7*b*), and covering the upper half lens (7*b*).

The semi-shutter (6) mounted in front of the upper reflector section (3) and the light shield (9) placed in front of the lower reflector section (2) are so positioned that the beams reflected from the light source (1) and reflector sections (2,3,2*a*, 2*b*, 2*c*) pass through the opening (8) between the upper edge of the light shield (9) and the lower edge of the semi-shutter (6) and reach to the lower half lens (7*a*) and are then directed only towards the road surface. The focal point (f4) of the lens (7) and the second focal point (f3) of the reflector section (3) are so adjusted that none of the beams directed by the lower half lens (7*a*) can exceed the horizontal plane XX passing through the optical center of the lens (7) and reach to the eye level (EE) of oncoming traffic users (the plane XX practically passes through the upper edge of the opening (8) of the forward-looking unit). As a result, a motor vehicle headlamp characterized by concealment of the light source and reflector surfaces from the oncoming traffic users and providing a long-distance illumination without glaring effect is obtained.

In the second preferred embodiment (50) schematically shown in FIG. 9, the preferred lower reflector section (2) is in the form of a hemisphere, with inside surface being reflective formed by two quarter spheres (2*a*, 2*b*) and a reflective separator (2*c*) inserted between them. There are slots on the separator (2*c*) and the rearmost side of the rear quarter (2*b*) of the hemisphere suitable for insertion of a bulb. This hemisphere (2*a*, 2*b*, 2*c*) is intended to use for illumination the light rays which are not used in the standards projection type headlamp to provide a more efficient illumination and to minimize the temperature increase within the headlamp. The front (2*a*) and rear (2*b*) quarters of the hemisphere (2) are so positioned that the beams reflected by the front (2*a*) quarter of the hemisphere (2) are reflected backwards near the first focal point (f1) of upper reflector section (3) where the light source filament or gas discharge gap is located. The rear quarter sphere (2*b*) is so positioned that the beams falling on this quarter (2*b*) are reflected to the separator (2*c*) and then towards the upper reflector section (3). They are then reflected to the lower half lens (7*a*), and projected only towards the road surface. None of these light beams exceeds the horizontal plane XX thereby causing no glaring effect, while obtaining the most efficient illumination.

The reflective separator (2*c*) has a flat reflective surface, but may also be concave, convex or a combination thereof. The hemisphere (2*a*, 2*b*) is a two-piece structure, but may also be a single or multi-piece structure, with its reflective surfaces being flat, concave, convex or a combination thereof. The hemisphere (2*a*, 2*b*, 2*c*) may be used to reflect the beams directed towards lower reflector section (2) to the upper reflector section (3) again which is located inside or outside the bulb corresponding to the bottom of the bulb filament or gas discharge gap. These components (2*a*, 2*b*, 2*c*) in question having a reflective character may be applied as a reflector structure (2,3) integrated with the upper reflector section, or as a separate reflector unit (2), without any limitation on the location, shape or surface structure. In these preferred embodiments, the upper reflector section (3) is used as the main reflector, whereas the lower reflector section (2) as the auxiliary reflector.

Figure 8:
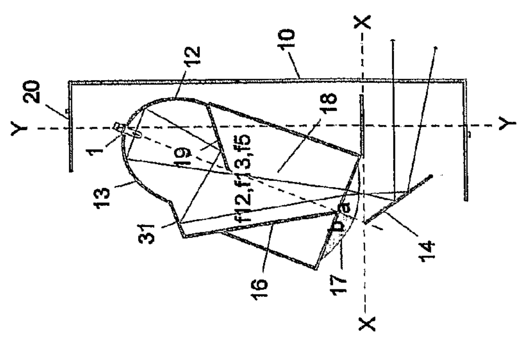
FIGS. 6, 7 and 8 show the headlamp design in which each unit of the first preferred embodiment (40) is used as an embodiment with a single reflector having an independent light source, based on the same operating principle.

The downward-looking unit (12,13) of the preferred embodiments (40,50) consists of the headlamp elements detailed below whether they are applied as a part of a "clover leaf shape" headlamp structure or as an independent headlamp unit:

The downward-looking unit of the first preferred embodiment (40) shown in FIGS. 2, 3 and 8 consists of is another application of the forward-looking unit facing downward with respect to the direction of traffic flow and operating to indirect illumination principle. The downward-looking headlamp unit in question contains at least one light source (1), at least one reflector section (12 and/or 13), at least one inclined light shield (19), at least one reflective surface (31) and at least one lens (17).

This embodiment has at least one mirror reflector (14) and at least one semi-shutter (16), and consists of a motor vehicle headlamp equipment characterized by the light source (1) and built-in reflective surfaces concealed from the oncoming traffic users, providing a long-distance illumination without any glaring effect.

This embodiment shown in FIGS. 2, 3 and 8 contains a semi-shutter (16) preventing the beams from the light source (1) and all built-in reflective surfaces from reaching to the rear half (17*b*) of the lens (17) and covering the rear half lens (17*b*) and an inclined shield (19) mounted in front of the reflector section (12).

The lens (17) is seen on the mirror reflector (14) surface. However, the rear edge of the shield (19) mounted in front of the reflector section (12) and the front edge of the semi-shutter (16) mounted in front of the reflector section (13) are so adjusted that both edges are located near the plane passing through the optical center of the lens (17), and prevent the light source and built-in reflective surfaces from being seen by oncoming traffic users on the mirror reflector (14). Hence, the mirror reflector (14) is avoided from receiving uncontrolled amount of light.

In the downward-looking unit of the preferred embodiment (40), the downward-looking reflector sections (12,13) are so designed that the light source (1) corresponds to the common first focal point (f1) of both reflector sections (12,13).

The second focal point (f13) of the reflector section (13) is so adjusted to be located near the middle of the rear edge of the inclined shield (19), which also corresponds to the focal point (f5) of the lens (17). The light rays coming from the rear reflector section (13) and focused on the second focal point (f13) are reflected to the front half lens (17*a*). These rays in question are directed by the front half lens (17*a*) to the mirror reflector (14). They are then reflected towards the road surface, and remain below the plane (X'X') passing through the upper edge of the opening (18) and parallel to the road surface (within the illumination zone), providing a long-distance illumination.

Most of the rays from the front reflector section (12) are reflected on the inclined shield (19). In the preferred embodiment (40), the inside surface of the shield (19) is reflective. However, the inside surface of the shield (19) may be non-reflective.

In the headlamp structure where the shield (19) is mounted in inclined position and its inside surface is reflective, there is a reflective surface (31) mounted at the bottom of the rear reflector section (13). The said reflective surface (31) reflects the beams from the shield (19) to the front half lens (17*a*) at predetermined angles, thereby providing a significant illumination advantage by illuminating the road edges, sidewalks, and turns.

The shield (19) and/or reflective surface (31) may have surface parts having two or more reflecting angles, or there may be one or more of each of such reflectors (19 and/or 31). The surface structure of these headlamp elements (19,31) may be flat, concave, convex or a combination thereof.

Part of the beams coming from the light source (1) and reflector section (12) is reflected on the semi-shutter (16) covering the rear half lens (17*b*). The semi-shutter (16) is mounted in front of the rear reflector section (13), and prevents the light from reaching to the rear half lens (17*b*). The said semi-shutter (16) also prevents the rear reflector section (13) from being seen by oncoming traffic users looking over the plane (X'X') on the mirror reflector (14) surface.

The semi-shutter (16) may be mounted in vertical or inclined position with respect to the axis passing through the optical center of the lens (17) in the downward-looking reflector unit (12,13). The inside surface of the semi-shutter (16) may be either reflective or non-reflective.

In embodiments where the semi-shutter (16) is in vertical position, some of the beams directly coming from the light source (1) and reflected from the front reflector section (12) are not used for illumination. Whereas in embodiments where the semi-shutter (16) is in inclined position, the semi-shutter (16) reflects the beams reflected on it to the front half lens (17*a*). These beams are directed by the front half lens (17*a*) to the mirror reflector (14) and then reflected towards the road surface. These beams also remain always below the plane (X'X') (within the illumination zone) and provide short-distance illumination.

The beams generated at the light source and directly reflected on the semi-shutter (16) are reflected to the front half lens (17*a*). The front half lens (17*a*) directs these beams to the mirror reflector (14). These beams are reflected from the mirror reflector (14) towards the road surface. These beams also remain always below the plane (X'X') (within the illumination zone) and contribute to short-distance illumination.

In the other headlamp structure, the semi-shutter (16) in the downward-looking reflector unit (12,13) may be replaced by a multi-flaps shutter (66) described in detail in the forward-looking reflector unit (2,3). The multi-flaps shutter (66) is the same as the shutter (66) in the forward-looking reflector unit (2,3) regarding their functions, only their directions in the headlamp are different. In this embodiment also, the front half lens (17*a*) is used as the main lens, and the rear half lens (17*b*) as the auxiliary lens. In this embodiment, the beams coming from both lens halves (17*a*, 17*b*) are reflected by the mirror reflector (14) only towards the road surface, and the oncoming traffic users looking over the plane (X'X') can not see the light source (1) and built-in reflective surfaces (12, 13, 31) although they see the image of the lens (17) on the mirror reflector (14) surface. Hence, no uncontrolled light can reach to the eye level (EE) of the oncoming traffic users, thereby causing no glaring effect.

In another application of the downward-looking unit (12, 13), the semi-shutter (16) may be replaced by an auxiliary prismatic lens (77) described in detail in the forward-looking headlamp unit (2,3) above.

The light shield (19) is placed in front of the front part (12) of the downward-looking reflector unit. The rear edge of the shield (19) and the front edge of the semi-shutter (16) are located near the plane passing through the optical center of the lens (17).

The inside surface of said inclined shield (19) is reflective, and reflects the beams coming from the light source (1) and front reflector section (12) to the reflective surface (31). The said reflective surface (31) is so angled as to reflect the beams from the shield (19) to the front half lens (17*a*). The front half lens (17*a*) directs these beams towards the mirror reflector (14). These beams are reflected by the mirror reflector (14) towards the road surface and provide short-distance illumination and can not exceed the plane (X'X'), which passes through the upper edge of the opening (18) and is parallel to the road surface.

The lens (17) is in the form of a plano-convex lens having a flat top surface and an aspherical bottom surface, and collects the light rays and projects it towards the mirror reflector (14). The front half lens (17*a*) in the downward-looking units of preferred embodiments (40,50) is used for illumination. However, the system may be implemented by constructing the lens only with sections used for illumination depending on the preferred cut-off type as shown in FIGS. 12*b* to 12*e*. The different types of lens (17*a*, 17*b*) used in the downward-looking units (12,13) of the preferred embodiments (40,50) have the same properties as the lens types (7*a*, 7*b*) described in detail in the forward-looking unit (2,3) above.

The opening (18) is located between the shield (19) and the semi-shutter (16) and in front of the mirror reflector (14), and passes the light rays coming from the light source (1) and reflector sections (12,13) to the mirror reflector (14) and then to the road surface. The upper edge of the opening (18) is on the plane (X'X').

The mirror reflector (14) is a flat mirror, and may be concave, convex or a combination thereof. The mirror reflector (14) reflects the light rays only towards the road surface. The mirror reflector (14) is seen by the oncoming traffic users, but the rear edge of the shield (19) in question and the front edge of the semi-shutter (16) are so adjusted that both edges are located near the plane passing through the optical center of the lens (17) and an observer, drivers and pedestrians looking over the plane (X'X'), passing through the upper edge of the headlamp opening (18) and upper edge of the mirror reflector (14) can see the image of the lens (17) on the mirror reflector (14), but not the light source (1) and reflective surfaces (12, 13,19,31).

None of the beams reflected by the mirror reflector (14) towards the road surface can exceed the plane (X'X'), nor reach to the eye level (EE) of the oncoming traffic users. Hence, an oncoming observer, drivers and pedestrians suffer no glaring effect.

Figure 11:
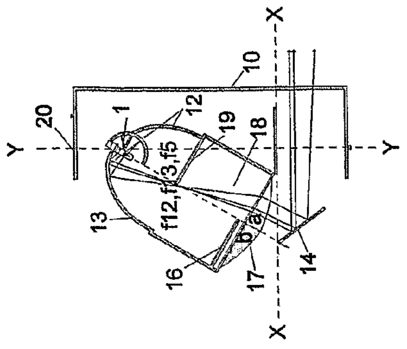
FIGS. 9, 10 and 11 show the headlamp design in which each unit of the first preferred embodiment (50) is used as an embodiment with a single reflector having an independent light source, with a modification on the lower reflector section (2*a*, 2*b*, 2*c*).

The downward-looking unit of the second preferred embodiment (50) shown in FIGS. 4, 5 and 11 consists of at least one light source (1), at least one reflector section (12,13), at least one light shield (19) and at least one lens (17).

This embodiment contains a semi-shutter (16) preventing the light rays coming from the light source (1), reflector sections (12,13) and all built-in reflective surfaces from reaching to the rear half lens (17*b*) and covering the rear half lens (17*b*), and at least one mirror reflector (14).

The semi-shutter (16) mounted in front of the rear reflector section (13) and the shield (19) placed in front of the front reflector section (12) are so positioned that the beams coming from the light source (1) and reflector sections (12,13) pass through the opening (18) between the rear edge of the light shield (19) and the front edge of the semi-shutter (16) and reach to the front half lens (17*a*) and are then directed towards the road surface. The focal point (f5) of the lens (17) and the second focal point (f13) of the reflector (13) are so adjusted that the beams directed by the front half lens (17*a*) are reflected by the mirror reflector (14) only towards the road surface, and none of these beams can exceed the horizontal plane X'X' passing through the upper edge of the opening (18) not reach to the eye level (EE) of oncoming traffic users. As a result, a motor vehicle headlamp characterized by concealment of the light source (1) and reflector surfaces (12,13) from the oncoming traffic users and providing a long-distance illumination without glaring effect is obtained.

In the second preferred embodiment (50), the preferred front reflector section (12) is the same as the lower reflector section (2*a*, 2*b*, 2*c*) described in detail in the forward-looking reflector unit (2,3) above, regarding their shape and function, the only difference is in their directions. In this embodiment, the rear reflector section (13) is used as the main reflector, whereas the front reflector section (12) as the auxiliary reflector.

One of the most important advantages of this preferred embodiment (50) is that the beams scattered from the light source towards the front reflector section (12) in standard projection type headlamp and therefore that can not be used for illumination and causing increase in temperature are used for illumination, thus providing maximum illumination performance on the road surface, and minimizing the temperature increase inside the headlamp, which is a significant problem with this type of headlamp. In this type of headlamp embodiment, the front reflector section (12) may either be integrated with the rear reflector section (13), or it may be manufactured as a separate reflector unit (12) and then mounted on the rear reflector section (13).

Figure 7:
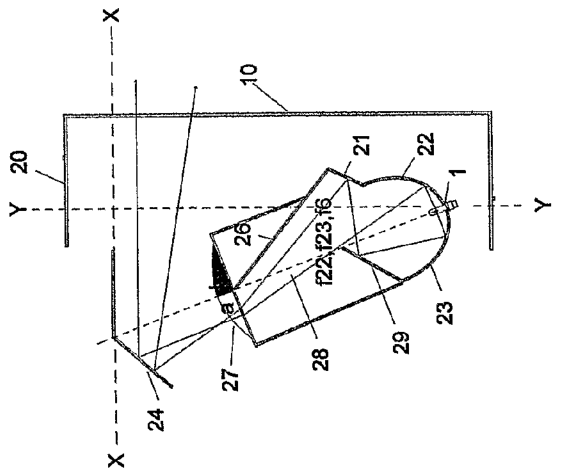

The upward-looking unit of the preferred embodiments (40,50) consists of the headlamp elements detailed below whether they are applied as a part of a "clover leaf shape" headlamp structure or as an independent headlamp unit:

The upward-looking unit (22,23) of the first preferred embodiment (40) shown in FIGS. 2, 3 and 7 consists of is another application of the forward-looking unit facing upward with respect to the direction of traffic flow and operating to indirect illumination principle. The upward-looking headlamp unit in question contains at least one light source (1), at least one reflector section (22 and/or 23), at least one inclined light shield (29), at least one reflective surface (21) and at least one lens (27).

This embodiment has at least one mirror reflector (24) and at least one semi-shutter (26), and consists of a motor vehicle headlamp equipment characterized by the light source and built-in reflective surfaces concealed from the oncoming traffic users, providing a long-distance illumination without any glaring effect.

This embodiment shown in FIGS. 2, 3 and 7 contains a semi-shutter (26) preventing the beams from the light source (1) and all built-in reflective surfaces from reaching to the front half (27*b*) of the lens (27) and covering the front half lens (27*b*) and an inclined shield (29) mounted in front of the reflector section (23).

The lens (27) is seen on the mirror reflector (24) surface. However, the front edge of the shield (29) mounted in front of the reflector (23) and the rear edge of the semi-shutter (26) mounted in front of the reflector (22) are so adjusted that both edges are located near the plane passing through the optical center of the lens (27), and prevent the light source and built-in reflective surfaces from being seen by oncoming traffic users on the mirror reflector (24). Hence, the mirror reflector (24) is avoided from receiving uncontrolled amount of light.

In the upward-looking unit of the first preferred embodiment (40), the upward-looking reflector sections (22, 23) are so designed that the light source (1) corresponds to the common first focal point (f1) of both reflector sections (22, 23).

The second focal point (f22) of the reflector section (22) is so adjusted to be located near the middle of the front edge of the inclined shield (29), which also corresponds to the focal point (f6) of the lens (27). The beams coming from the front reflector section (22) and focused on the second focal point (f22) are reflected to the rear half lens (27*a*). These beams in question are directed by the rear half (27*a*) of the lens to the mirror reflector (24). They are then reflected towards the road surface, and remain below the plane (X"X") passing through the upper edge of the opening (28) and parallel to the road surface (within the illumination zone), providing a long-distance illumination.

Most of the light rays from the rear reflector section (23) are reflected on the inclined light shield (29). In the preferred embodiment (40), the inside surface of the shield (29) is reflective. However, the inside surface of the shield (29) may be non-reflective.

In the headlamp structure where the shield (29) is mounted in inclined position and its inside surface is reflective, there is a reflective surface (21) mounted at the top of the front reflector section (22) and directing the beams reflected by the shield (29) to the rear half lens (27*a*). The reflective surface (21) reflects the beams reflected on it to the rear half lens (27*a*) at predetermined angles, thereby providing a significant illumination advantage and traffic safety by illuminating the road edges, sidewalks and turns.

The shield (29) and/or reflective surface (21) may have surface parts having two or more reflecting angles, or there may be one or more of each of such components (29 and/or 21). The surface structure of these headlamp components (29,21) may be flat, concave, convex or a combination thereof.

Some of the light rays coming from the light source (1) and reflector section (23) are reflected on the semi-shutter (26) covering the front half lens (27*b*). The semi-shutter (26) is mounted in front of the front reflector section (22), and prevents the light rays from reaching to the front half lens (27*b*). The said semi-shutter (26) also prevents the front reflector section (22) from being seen by oncoming traffic users looking over the plane (X"X") on the mirror reflector (24) surface.

The semi-shutter (26) may be mounted in vertical or inclined position with respect to the axis passing through the optical center of the lens (27) in the upward-looking reflector unit (22,23). The inside surface of the semi-shutter (26) may be either reflective or non-reflective.

In embodiments where the semi-shutter (26) is in vertical position, the beams directly coming from the light source (1) and some of those reflected from the rear reflector section (23) are not used for illumination. Whereas in embodiments where the semi-shutter (26) is in inclined position, the semi-shutter (26) reflects the beams reflected on it to the rear half lens (27*a*). These beams are directed by the rear half lens (27*a*) to the mirror reflector (24) and then reflected towards the road surface. These beams also remain always below the plane (X"X") (within the illumination zone) and provide short-distance illumination.

The beams generated at the light source (1) and directly reflected on the semi-shutter (26) are reflected to the rear half lens (27*a*). The rear half lens (27*a*) directs these beams towards the mirror reflector (24). These beams are reflected from the mirror reflector (24) towards the road surface. These beams also remain always below the plane (X"X") (within the illumination zone) and contribute to short-distance illumination.

In the other headlamp structure, the semi-shutter (26) in the upward-looking reflector unit (22,23) may be replaced by a multi-flaps shutter (66) described in detail in the forward-looking reflector unit (2,3). This shutter (66) is the same as the multi-flaps shutter (66) in the forward-looking reflector unit (2, 3) regarding their functions; only their directions in the headlamp are different. In this embodiment also, the rear half lens (27*a*) is used as the main lens, and the front half lens (27*b*) as the auxiliary lens. In this embodiment, the beams coming from both lens halves (27*a*, 27*b*) are reflected by the mirror reflector (24) only towards the road surface, and the oncoming traffic users looking over the plane (X"X") can not see the light source (1) and built-in reflective surfaces (22, 23, 21) although they see the image of the lens (27). Hence, no uncontrolled light can reach to the eye level (EE) of the oncoming traffic users, thereby causing no glaring effect.

Similarly, the semi-shutter (26) may be replaced by an auxiliary prismatic lens (77) described in detail in the forward-looking headlamp unit (2,3) above.

The light shield (29) is placed in front of the rear reflector section (23) of the upward-looking reflector unit. The front edge of the shield (29) and the rear edge of the semi-shutter (26) are located near the plane passing through the optical center of the lens (27) in the upward-looking reflector unit (22,23). In this embodiment, the upper edge of the mirror reflector (24) is located near the plane (X"X") passing through the upper edge of the opening (28) and is parallel to the road surface.

In the embodiment where the shield (29) is in inclined position and has a reflective inside surface, the light rays coming from the light source (1) and rear reflector section (23) are reflected by the shield (29) to the reflective surface (21). The said reflective surface (21) is so angled as to reflect the beams from the shield (29) to the rear half lens (27*a*). The rear half lens (27*a*) directs these beams towards the mirror reflector (24). These beams are reflected by the mirror reflector (24) towards the road surface and provide short-distance illumination and can not exceed the plane (X"X"), which passes through the upper edge of the opening (28) and is parallel to the road surface.

The lens (27) is in the form of a plano-convex lens, having a flat bottom surface and an aspherical top surface, and collects the light and projects it towards the mirror reflector (24). The rear half (27*a*) of the lens in the upward-looking units of preferred embodiments (40,50) is used for illumination. However, the system may be implemented by constructing the lens only with sections used for illumination depending on the preferred cut-off type as shown in FIGS. 12*b* to 12*e*. The different types of lens (27*a*, 27*b*) used in the upward-looking units (22,23) of the preferred embodiments (40,50) have the same properties as the lens types (7*a*, 7*b*) described in detail in the forward-looking unit (2,3) above.

The opening (28) is located between the shield (29) and the semi-shutter (26) and in front of the mirror reflector (24), and the light rays coming from the light source (1) and reflector sections (22,23) passes to the mirror reflector (24) and then towards the road surface. The upper edge of the opening (28) and the upper edge of the mirror reflector (24) are located near the plane (X"X").

The mirror reflector (24) is a flat mirror, and may be concave, convex or a combination thereof. The mirror reflector (24) reflects the light rays only towards the road surface. The mirror reflector (24) is seen by the oncoming traffic users, but the front edge of the shield (29) in question and the rear edge of the semi-shutter (26) are so adjusted that both edges are located near the plane passing through the optical center of the lens (27) and an observer, drivers and pedestrians looking over the plane (X"X"), passing through the upper edge of the headlamp opening (28) and upper edge of the mirror reflector (24) can see the image of the lens (27) on the mirror reflector (24), but not the light source (1) and reflective surfaces (22, 23, 29, 21).

None of the beams reflected by the mirror reflector (24) towards the road surface can exceed the plane (X"X") passing through the upper edge of the opening (28), not reach to the eye level (EE) of the oncoming traffic users. Hence, an oncoming observer, drivers and pedestrians suffer no glaring effect.

Figure 10:
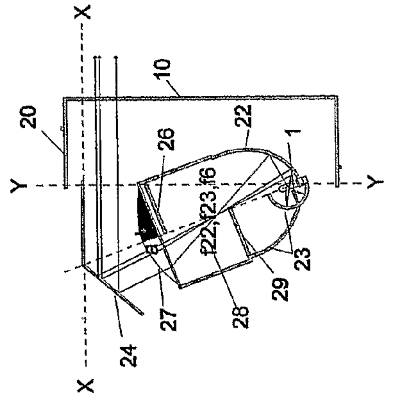

The upward-looking unit of the second preferred embodiment (50) shown in FIGS. 4, 5 and 10 consists of at least one light source (1), at least one reflector sections (22,23), at least one light shield (29), and at least one lens (27).

This embodiment contains a semi-shutter (26) preventing the light rays coming from the light source (1), reflector sections (22,23) and all built-in reflective surfaces from reaching to the front half lens (27*b*) and covering the front half lens (27*b*), and at least one mirror reflector (24).

The positions of the semi-shutter (26) mounted in front of the front reflector section (22) and of the light shield (29) placed in front of the rear reflector section (23) are so adjusted that the beams directly coming from the light source (1) and reflected from the reflector sections (22, 23) pass through the opening (28) between the front edge of the light shield (29) and the rear edge of the semi-shutter (26) and reach to the rear half lens (27*a*). The focal point (f6) of the lens (27) and the second focal point (f22) of the reflector section (22) are so adjusted that the beams directed by the rear half lens (27*a*) are reflected by the mirror reflector (24) only towards the road surface, and none of these beams can exceed the horizontal plane X"X" passing through the upper edge of the opening (28) not reach to the eye level (EE) of oncoming traffic users. As a result, a motor vehicle headlamp characterized by concealment of the light source (1) and reflector surfaces (22,23) from the oncoming traffic users and providing a long-distance illumination without glaring effect is obtained.

In the second preferred embodiment (50), the preferred rear reflector section (23) is the same as the lower reflector section (2*a*, 2*b*, 2*c*) described in detail in the forward-looking reflector unit (2,3) above, regarding their shape and function, the only difference is in their directions. In this embodiment, the front reflector section (22) is used as the main reflector, whereas the rear reflector section (23) as the auxiliary reflector.

One of the most important advantages of this preferred embodiment (50) is that the beams scattered from the light source (1) towards the rear reflector section (23) in standard projection type headlamp and therefore that can not be used for illumination and causing increase in temperature are used for illumination, thus providing maximum illumination performance on the road surface, and minimizing the temperature increase within the headlamp, which is a significant problem with this type of headlamp.

In this type of headlamp embodiment, the rear reflector section (23) may either be integrated with the front reflector section (22), or it may be manufactured as a separate reflector unit (23) and then mounted on the front reflector section (22).

Figure 6:
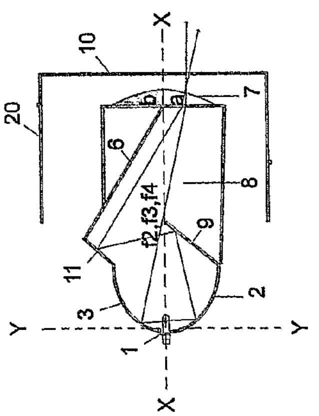

A number of different headlamp design combinations may be developed without any limitation on the number, shape and position of the reflectors (2,2*a*, 2*b*, 2*c*, 3,12,13,22,23), all built-in components (6,16,26,9,19,29,11,21,31,66), lens (7,17, 27,77) or other built-in components in the preferred headlamp embodiments (40,50) described in detailed above, with operating mechanism remaining unchanged. A few examples of such embodiments are shown below:

FIGS. 6 and 9 show a headlamp design with a single reflector, which is the application of the forward-looking units in the preferred embodiments (40,50) with a single reflector having its own light source, and has similar properties, functions and operating principles as the forward-looking units of these embodiments (40,50).

FIGS. 7 and 10 show a headlamp design with a single reflector, which is the application of the upward-looking units in the preferred embodiments (40,50) with a single reflector having its own light source, and has similar properties, functions and operating principles as the upward-looking units of these embodiments (40,50).

FIGS. 8 and 11 show a headlamp design with a single reflector, which is the application of the downward-looking units in the preferred embodiments (40,50) with a single reflector having its own light source, and has similar properties, functions and operating principles as the downward-looking units of these embodiments (40,50).

The embodiments in FIGS. 6, 7, 8, 9, 10 and 11 may be applied as combined structures having a single light source, or with each unit having its own light source, in the form of groups formed by two, three or more reflectors, without any limitation on the direction and number.

FIGS. 13*a, b* and *c* are the side view (13*a*), perspective (13*b*) and front view (13*c*) of the preferred shutter types. FIGS. 13*d, e, f* and *g*, show different applications of the preferred embodiments (40,50) FIG. 13*d*, shows the schematic view of the reflection technique used in the embodiment with shutter; FIG. 13*e*, shows the schematic view of application of the system with LED (light emitting diode); FIG. 13*f*, shows the embodiment in which the lower reflector section is in the form of hemisphere (2*a*, 2*b*, 2*c*); FIG. 13*g*, shows the detailed perspective view of said preferred hemisphere).

With embodiments using LED light source, schematically shown in FIG. 13*e*, the motor vehicle headlamp systems providing long-distance illumination without glaring effect may be applied by providing each reflector surface with its own LED light source, having sufficient light intensity, and with each LED reflector surface directing the light towards the lower half lens (7*a*) and then towards the road surface, provided that the half lens illumination principle remains unchanged. The motor vehicle headlamp systems providing long-distance illumination without glaring effect may also be applied by using optical fiber-based illumination technique, provided that the half lens illumination principle remains unchanged.

Similarly, the light shields (9,19,29) and/or semi-shutters (6,16,26) or other headlamp components may be applied as movable headlamp components, without any limitation on the number, shape and positioning angle.

The system based on half lens illumination principle shown in FIG. 14 and described in detail above may be applied directly within the lighting assembly: As well as such in-bulb application of the system may be used in motor vehicle lighting, it may also be used in all indoor and outdoor general lighting and lighting of all optical devices, provided that the same operating principles are followed.

For these purposes, a preferred in-bulb application (60) described in detail below and shown schematically in FIG. 14 may be used with all known light sources (bulb types) as well as filament, incandescent, fluorescent, HID (high intensity discharge), LED or optical fiber based light sources and other different light sources.

The preferred in-bulb application (60) incorporates at least one micro-reflector (62 and/or 63), at least one micro-light shield (69), at least one micro-semi-shutter (66) and at least one micro-lens (67). The embodiments where the light shield (69) is inclined and reflective may incorporate one or more additional auxiliary micro-reflective surfaces (65). The light source (bulb) in the preferred embodiment is mounted inside a cylindrical glass tube (68), and different types of glass tube may be used, or the system may be applied without a glass tube. With this type of bulbs, the gas discharge gap or filament of the light source (1) is placed such that it corresponds to the first focal point (f1) of the micro-reflector (62,63). The light shield (69) and semi-shutter (66) are so mounted as to prevent the gas discharge gap or filament from being seen from the opposite direction, but to allow passing of the light. In this embodiment, the upper edge of the shield (69) and the lower edge of the semi-shutter (66) are located near the horizontal plane passing through the optical center of the micro-lens (67), and no light can reach to the eye level (EE) of an observer looking over this plane, thereby causing no glaring effect. In the embodiment where the micro-shield (69) is inclined and its inside surface is reflective, there may be a micro-reflective surface (61) mounted in front of the upper micro-reflector section corresponding to the shield (69). The reflective surface (61) is so angled as to reflect the beams coming from the shield (69) to the lower half (67*a*) of the micro-lens (67).

Similarly, when the in-bulb application is used in general lighting, no glaring effect is caused on the eye of an observer existing outside the intended illumination zone, or when the system is used in an optical device, an excellent optical illumination performance can be achieved as there is no uncontrolled and eye-disturbing beam in the field of vision or direction of view.

A number of modifications may be made on the light sources and their built-in components used in this type of embodiments, provided that the main operating principle of the system is followed. For this purpose, among the others, the micro-semi-shutter (66) may be replaced by a micro-shutter (66), or a micro-prismatic lens used in the headlamp embodiments described in detail above or another equivalent micro-lens may be used. The lower reflector section (62) may be replaced by a reflecting hemisphere or a reflecting surface with similar functions inside the bulb to direct the beams falling at the bottom towards the upper reflector section (63).

The invention claimed is:

1. A headlamp with long-distance illumination without glaring effects, comprising:
- at least one light source;
- at least one light shield;
- at least one lens;
- at least one upper reflector surface;
- at least one semi-shutter covering an upper half of said lens, the semi-shutter preventing the beams coming from the light source; and
- a hemisphere forming a second reflector surface in order to reflect the beams coming from the light source to the upper reflector surface,
- wherein said light source and reflector surfaces are concealed from oncoming traffic users.

2. The headlamp according to claim 1 wherein said hemisphere consists of two quarter spheres and a separator inserted between them.

3. The headlamp according to claim 1 wherein said hemisphere consists of a single piece structure with its reflective surfaces being flat, concave, convex or a combination thereof.

4. The headlamp according to claim 1 wherein said lens comprises at least one lens section which can applied in the form of the preferred cut-off type.

5. A headlamp with long-distance illumination without glaring effects, comprising:
- at least one light source;
- at least one light shield;
- at least one semi-shutter;
- at least one lens;
- at least one first reflector section; and
- a second reflector section in the form of a hemisphere in order to reflect the beams coming from the light source to the first reflector section,
- wherein said light source and reflector sections are concealed from oncoming traffic users such that the light beams coming from the light source and said reflective sections and other built-in reflected surfaces are directed only towards the road surface but not to the level of oncoming traffic user's eyes, and
- wherein said lens comprises an upper half lens which has at least one prismatic lens in place of the upper part of the lens.

6. The headlamp according to claim 5 further comprising a multi-flap shutter covering the upper half lens.

7. The headlamp according to claim 1 wherein said lens comprises an upper half lens having a preferred cut-off type being one of semi-translucent, non-translucent, and a lens section having different refractivity compared to the lower half lens.

8. The headlamp according to claim 1 wherein at least one LED (Light Emitting Diode) can be used as said light source.

9. A light bulb operating according to a half lens illumination principle without glaring effect to be used in a headlamp, general lighting and in all optical devices, comprising:

at least one micro-reflector;

at least one micro-shield concealing a lower surface of the micro-reflector;

at least one micro-lens;

at least one micro-semi-shutter covering an upper half of the micro-lens; and at least one hemisphere forming a second reflector surface which re-reflects the light beams, which are coming onto itself and reflected to the micro-reflector, towards a lower half of the micro-lens that is not covered by the micro-semi-shutter.

* * * * *